(12) United States Patent
Shi

(10) Patent No.: US 11,953,806 B2
(45) Date of Patent: Apr. 9, 2024

(54) ADJUSTABLE BACKDROP SUPPORT SYSTEM KIT

(71) Applicant: Emart International, Inc., Rowland Heights, CA (US)

(72) Inventor: Tinglei Shi, City of Industry, CA (US)

(*) Notice: Subject to any disclaimer, the term of this patent is extended or adjusted under 35 U.S.C. 154(b) by 0 days.

(21) Appl. No.: 17/849,798

(22) Filed: Jun. 27, 2022

(65) Prior Publication Data

US 2023/0418132 A1 Dec. 28, 2023

(51) Int. Cl.
| | |
|---|---|
| *F16M 11/26* | (2006.01) |
| *F16M 11/04* | (2006.01) |
| *F16M 11/24* | (2006.01) |
| *G03B 15/08* | (2021.01) |

(52) U.S. Cl.
CPC ........... *G03B 15/08* (2013.01); *F16M 11/046* (2013.01); *F16M 11/242* (2013.01); *F16M 11/04* (2013.01); *F16M 11/24* (2013.01)

(58) Field of Classification Search
CPC ...... G03B 15/08; G03B 15/06; F16M 11/046; F16M 11/242; F16M 11/041; F16M 11/04; F16M 11/42; F16M 11/26; F16M 11/24; A47B 81/06
USPC ........................................................ 248/472
See application file for complete search history.

(56) References Cited

U.S. PATENT DOCUMENTS

| | | | | |
|---|---|---|---|---|
| 1,510,272 A | * | 9/1924 | Harmount | A47G 25/0664 248/412 |
| 3,087,701 A | * | 4/1963 | Wallace | A47C 20/06 248/166 |
| 3,336,682 A | * | 8/1967 | Genin | B43L 1/008 434/416 |
| 4,111,575 A | * | 9/1978 | Hoshino | F16B 7/1418 403/373 |
| 4,988,064 A | * | 1/1991 | Hoshino | F16M 11/2057 248/173 |
| 5,078,348 A | * | 1/1992 | Babitchenko | F16M 11/38 248/370 |
| 6,046,845 A | * | 4/2000 | Niwa | G03B 21/58 359/461 |
| 6,983,916 B2 | * | 1/2006 | Raynaud | F16M 11/2078 248/163.2 |

(Continued)

OTHER PUBLICATIONS

EMART Photo Video Studio 10×7Ft (W×H) Adjustable Background Stand Backdrop Support System Kit with Carry Bag—https://www.amazon.com/Studio-Adjustable-Background-Backdrop-Support/dp (character limit exceeded—see full citation in Office Action) (Year: 2014).*

(Continued)

*Primary Examiner* — Nkeisha Smith
(74) *Attorney, Agent, or Firm* — Tsz Lung Yeung

(57) ABSTRACT

An adjustable backdrop support system kit includes at least two interlocking bars, two adjustable tripod stands and a backdrop, during usage, the at least two interlocking bars are interlocked with each other to form a supporting crossbar having two ends which are respectively on tops of the two adjustable tripod stands to configure a support system for supporting a backdrop at a predetermined height, wherein the backdrop is adapted for being supported by the supporting crossbar and being extending downward to provide a photographing background environment.

3 Claims, 14 Drawing Sheets

(56) References Cited

U.S. PATENT DOCUMENTS

| | | | | |
|---|---|---|---|---|
| 7,530,543 | B1* | 5/2009 | Kremzar | A47B 97/02 |
| | | | | 248/188.7 |
| 9,051,751 | B2* | 6/2015 | Ogilvie | E04H 15/005 |
| 10,704,731 | B2* | 7/2020 | Kim | F16B 2/065 |
| 10,794,113 | B2* | 10/2020 | Tapley | E06B 9/24 |
| D947,926 | S* | 4/2022 | Tian | D16/244 |
| 11,371,644 | B2* | 6/2022 | Leclerc | F16M 11/08 |
| 11,460,147 | B2* | 10/2022 | You | F16M 11/16 |
| 11,569,643 | B2* | 1/2023 | Rokuskie | H02G 7/00 |
| 2006/0065615 | A1* | 3/2006 | Wang | A47F 7/24 |
| | | | | 211/206 |
| 2006/0086869 | A1* | 4/2006 | Hsieh | F16M 11/16 |
| | | | | 248/171 |
| 2010/0019109 | A1* | 1/2010 | Liu | F16M 11/16 |
| | | | | 248/188 |
| 2010/0294900 | A1* | 11/2010 | Maurer | A45F 3/44 |
| | | | | 248/419 |
| 2011/0299841 | A1* | 12/2011 | Cheng | G03B 15/06 |
| | | | | 396/3 |
| 2013/0097058 | A1* | 4/2013 | Baker | G03B 15/06 |
| | | | | 396/3 |
| 2015/0076295 | A1* | 3/2015 | Fiorese | F16M 11/046 |
| | | | | 248/161 |
| 2018/0015343 | A1* | 1/2018 | Orenstein | A63B 61/003 |
| 2019/0063665 | A1* | 2/2019 | LeCote | F16M 13/02 |

OTHER PUBLICATIONS

EMART Photo Video Studio 10×7Ft (W×H) Adjustable Background Stand Backdrop Support System Kit with Carry Bag User Manual (as cited on the Amazon page) (Year: 2014).*

* cited by examiner

ADJUSTABLE BACKDROP SUPPORT SYSTEM KIT

BACKGROUND OF THE PRESENT INVENTION

Field of Invention

The present invention relates to a backdrop support system, and more particularly to an adjustable backdrop support system kit.

Description of Related Arts

During film and television photographing or online live broadcasting, a green screen technology is often used. By photographing with a green screen background, a creator can easily edit and replace the background after a photo or a video is shot. When the capital budge is sufficient, a relatively large green background can be fixed on a wall, but the fixed green background cannot be moved, the installation and removal of the large green background is inconvenient, and the cost is high, so that the relatively large green background is not affordable in a common small sized shooting occasion and lacks flexibility.

SUMMARY OF THE PRESENT INVENTION

The invention is advantageous in that it provides an adjustable backdrop support system kit which is adapted for being assembled in an application environment with photographic background requirements such as a photographing studio.

Another advantage of the present invention is to provide an adjustable backdrop support system kit which comprises a plurality of detachable structures, so that it can be easy for storing.

Another advantage of the present invention is to provide an adjustable backdrop support system kit which employs a structure that can be collapsed and unfolded, and the adjustable backdrop support system kit can be quickly deployed and unfolded when required.

Another advantage of the present invention is to provide an adjustable backdrop support system kit which comprises an adjustable vertical rod assembly which comprises multiple sections, so that a supporting height for the backdrop by the adjustable backdrop support system kit is allowed to be varied in a range.

Another advantage of the present invention is to provide an adjustable backdrop support system kit which comprises a plurality of interlocking bars to adjust a supporting width for the backdrop by the adjustable backdrop support system kit.

Another advantage of the present invention is to provide an adjustable backdrop support system kit which comprises tripod bases providing support along multiple directions, rendering the adjustable backdrop support system kit to be stably supported on a supporting surface.

Another advantage of the present invention is to provide an adjustable backdrop support system kit which comprises a linkage ring to drive all of the supporting legs to be unfolded and collapsed simultaneously.

Another advantage of the present invention is to provide an adjustable backdrop support system kit which comprise adjustable tripod stands that can be locked in position by a plurality of locking structures when the adjustable tripod stands are unfolded and adjusted to a desired configuration.

Another advantage of the present invention is to provide an adjustable backdrop support system kit which comprise a plurality of clamps for fixing the backdrop on the adjustable backdrop support system kit.

Another advantage of the present invention is to provide an adjustable backdrop support system kit which is able to reduce stress to the structure and prevent the falling of the adjustable backdrop support system kit by a plurality of slip prevention structures, so that the structure of the adjustable backdrop support system kit is more stable.

Another advantage of the present invention is to provide an adjustable backdrop support system kit, wherein related parameters are selected so that the adjustable backdrop support system kit can be securely and stably applied to different application environments.

In order to achieve at least one of the above advantages, according to an aspect of the present invention, the present invention provides an adjustable backdrop support system kit comprising:

at least two interlocking bars;
two adjustable tripod stands; and
a backdrop, during usage the at least two interlocking bars are interlocked with each other to form a supporting crossbar comprising two ends which are respectively on tops of the two adjustable tripod stands to configure a support system for supporting the backdrop at a predetermined height, wherein the backdrop is adapted for being supported by the supporting crossbar and being extending downward to provide a photographing background environment.

According to another aspect of the present invention, the present invention further provides an adjustable backdrop support system for supporting a backdrop, wherein the adjustable backdrop support system comprises:

at least two interlocking bars; and
two adjustable tripod stands, wherein at least two interlocking bars are interlocked with each other to form a supporting crossbar comprising two ends which are respectively on tops of the two adjustable tripod stands to configure a support system for supporting the backdrop at a predetermined height, wherein the backdrop is adapted for being supported by the supporting crossbar and being extending downward to provide a photographing background environment.

The present invention further provides an adjustable tripod stand for adjustable backdrop support system kit, wherein the adjustable tripod stand comprises an adjustable vertical rod assembly and a tripod base which is mounted to the adjustable vertical rod assembly and is able to be collapsed and unfolded.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

It should be understood that the term "a" should be understood as "at least one" or "one or more". In other words, in one embodiment, the number of an element may be one, and in another embodiment, the number of the element may be plural. The term "one" should not be understood as a limitation on the number.

Figure 1:
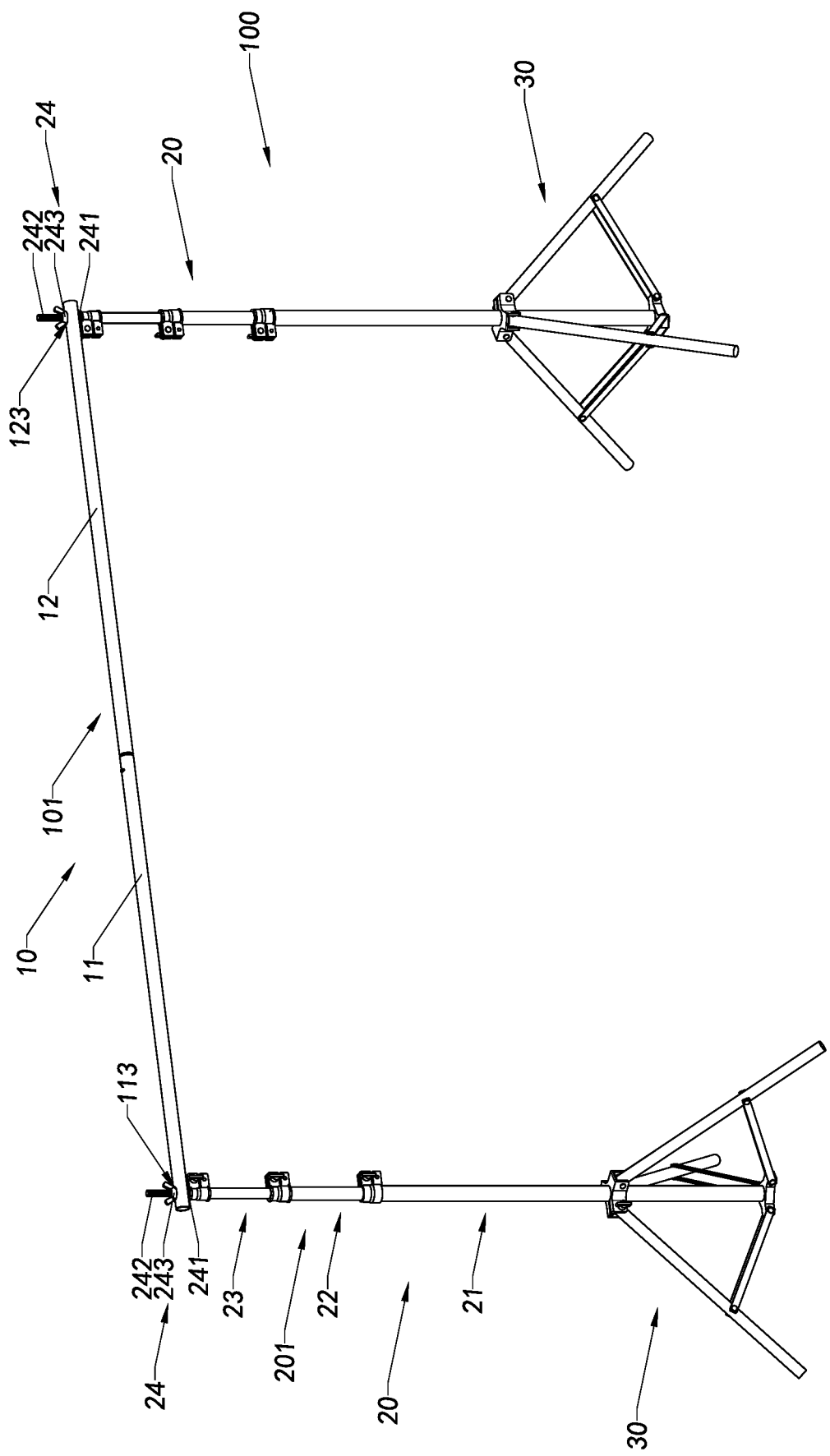
FIG. 1 is a perspective view of an adjustable backdrop support system according to a preferred embodiment of the present invention.
Figure 2:
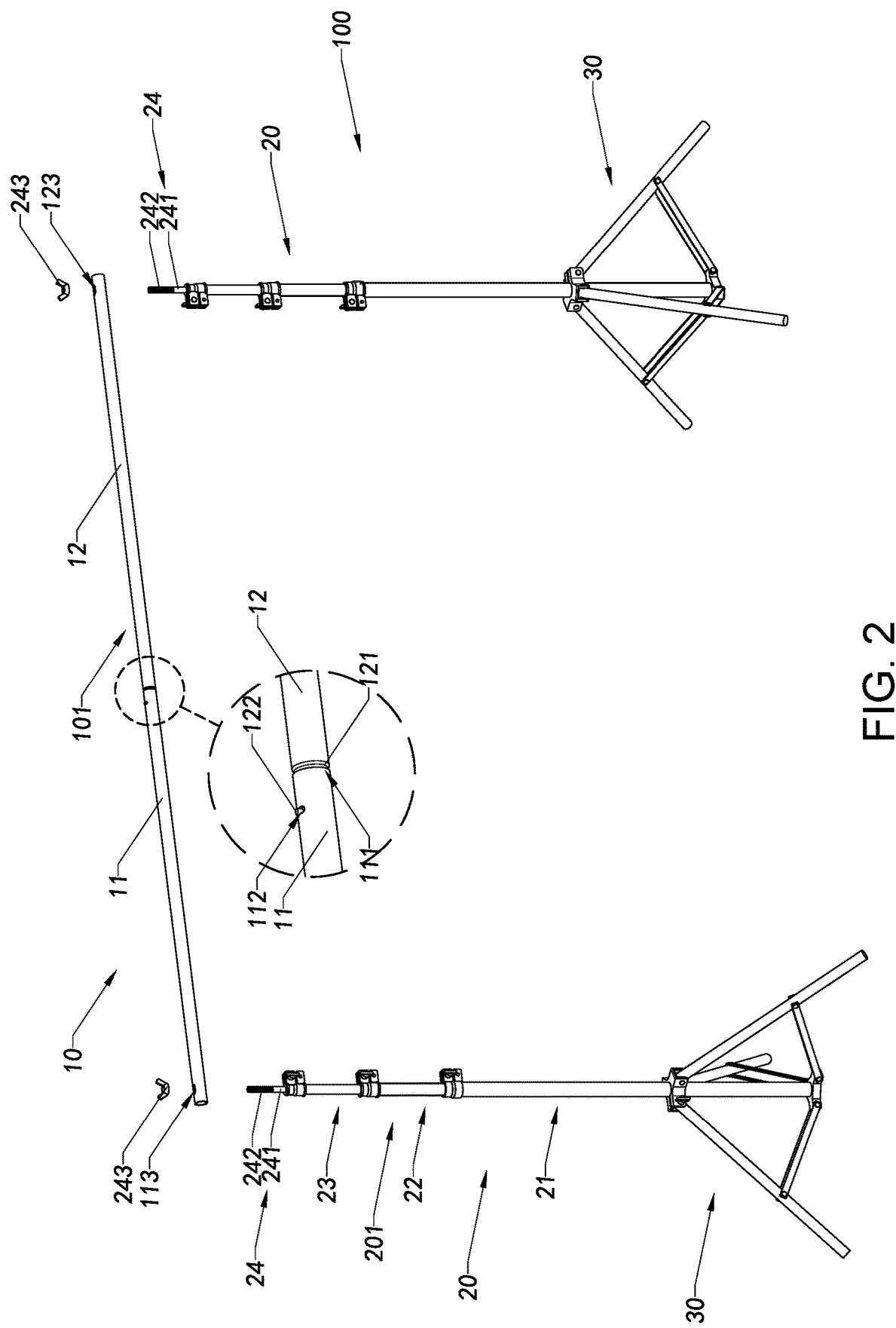
FIG. 2 is a perspective view illustrating a plurality of interlocking bars of the adjustable backdrop support system being locked with each other according to the above preferred embodiment of the present invention.
Figure 3:
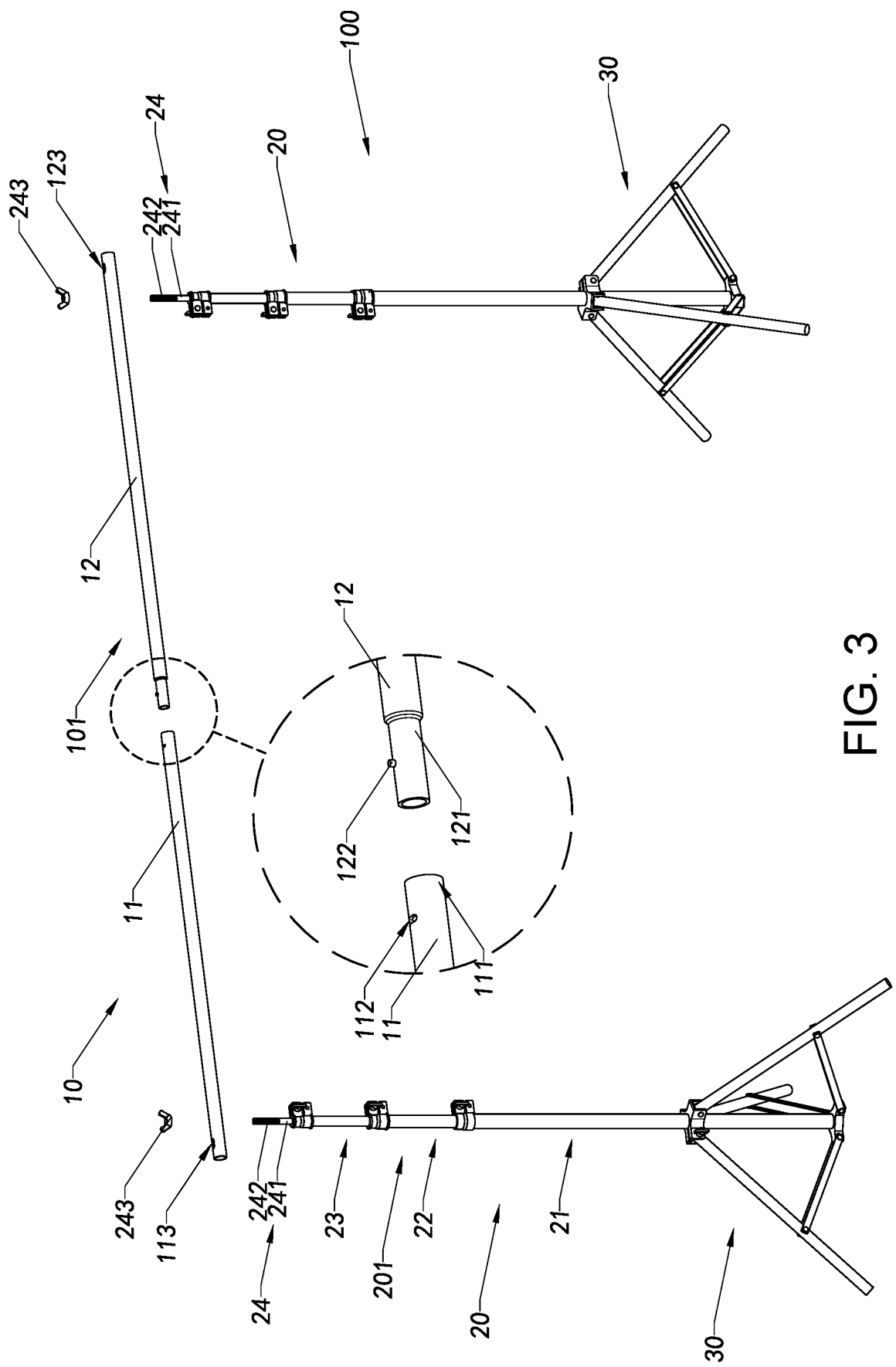
FIG. 3 is a perspective view illustrating the plurality of interlocking bars of the adjustable backdrop support system being separated from each other according to the above preferred embodiment of the present invention.

Referring to FIG. 1 to FIG. 3 of the drawings, an adjustable backdrop support system according to a preferred embodiment of the present invention is illustrated, the adjustable backdrop support system comprises a plurality of detachable and collapsible components which are assembled with each other to form a backdrop support system for supporting a backdrop 40. When in a collapsed state for storing the adjustable backdrop support system, the components can be detached and disassembled and folded into several smaller assemblies, as is shown in FIG. 2 of the drawings. When it is needed in application, the adjustable backdrop support system of this preferred embodiment of the present invention can be quickly unfolded from multiple assemblies and assembled for a user to use, as is shown in FIG. 1 of the drawings. After the adjustable backdrop support system assembled, the user can stably hang and fix the backdrop 40 to the adjustable backdrop support system according to his or her own needs.

This preferred embodiment of the present invention provides the adjustable backdrop support system kit 1 which is used for being assembled to provide a photographic background environment, for example, but not limited to, a green background environment and a white background environment. The adjustable backdrop support system kit 1 is suitable for being used in professional photographing shops, photo studios, family gatherings, weddings, baby's ceremonies or party decoration environments. The adjustable backdrop support system kit 1 is especially suitable for video shooting, such as video shooting for live streaming media on YouTube, TikTok, Facebook, and Instagram.

The adjustable backdrop support system kit 1 comprises at least two interlocking bars 10 and two adjustable tripod stands 20. The at least two interlocking bars 10 can be assembled with the two adjustable tripod stands 20 to form a support system 100 that is used for supporting the backdrop 40. In other words, the support system 100 formed by the at least two interlocking bars 10 and the two adjustable tripod stands 20 provides a support for the backdrop 40, so that the backdrop 40 can be unfolded or can be set up and supported in a predetermined configuration. During usage, after the support system 100 is assembled and formed, the backdrop 40 is placed on the interlocking bar 10 to form the photographic background environment.

The at least two interlocking bars 10 can be assembled with each other to form a supporting crossbar 101 comprising two ends that are respectively supported and installed on the two adjustable tripod stands 20. In application, the at least two interlocking bars 10 are assembled in an interlocking manner to form the supporting crossbar 101, and the two ends of the supporting crossbar 101 are respectively supported and fixed to top ends of the two adjustable tripod stands 20, so as to form the support system 100 with a predetermined supporting height, so as to allow the backdrop 40 to be placed on the supporting crossbar 101 and extend downward from the supporting crossbar 101, thereby forming the photographic background environment.

It is worth mentioning that the adjustable backdrop support system kit has an adjustable supporting width and an adjustable supporting height for the backdrop, so that it is easy to assemble and use.

The backdrop 40 may be selected from one of green screen, white screen, canvas, muslin, cotton fabric, paper or PVC background screen.

At sale, the adjustable backdrop support system kit 1 may be sold with or without the backdrop 40. In other words, the user may prepare the backdrop 40 by himself of herself.

According to one embodiment of the present invention, the adjustable backdrop support system kit 1 may comprise four interlocking bars, two adjustable tripod stands 20 and three spring clamps 50, two empty sandbags 70 and one carrying case 60.

Further, in this preferred embodiment of the present invention, the at least two interlocking bars 10 comprise four interlocking bars that can be assembled in an interlocked manner with each other. In an alternative mode of the present invention, the at least two interlocking bars 10 may also comprise other numbers of the interlocking bars, such as but not limited to 1, 2, 3, 5 and above. It is worth mentioning that, in practical commercial applications, the adjustable backdrop support system kit 1 is more suitable for providing the photographic background environment in a small space. On one hand, the choice of the number and length of the interlocking bars 10 affects the supporting width of the adjustable backdrop support system kit 1 for the backdrop 40. On the other hand, the choice of the number and the length of the interlocking bars 10 affects the structural strength of the adjustable backdrop support system kit 1. More specifically, the larger the number of the interlocking bars 10, and the longer of the interlocking bars the longer the length of the backdrop 40 being supported, the heavier the weight of the backdrop 40 being supported, and the more inconvenient to use, and the easier it is to deform along the extending line of the supporting crossbar 101 assembled by the interlocking bars 10. Therefore, considering the size requirements of the shooting environment and the stability of the supporting and bearing of the backdrop 40, preferably, the number of the interlocking bars 10 is 2, 3, 4, and 5

According to one preferred embodiment, the adjustable backdrop support system kit 1 comprises four interlocking bars 10, two adjustable tripod stands 20. The backdrop can be prepared by the user according to his or her own need. The length of each of the interlocking bars 10 is 2.5 ft.

According to one preferred embodiment, the adjustable backdrop support system kit 1 comprises four interlocking bars 10, two adjustable tripod stands 2, three spring clamps 50 each is used to clamp and fix the backdrop 40 to the interlocking bars 10, and two sandbags 70 for fixing and retaining the two adjustable tripod stands 2 in position respectively.

Each of the adjustable tripod stands 20 comprises an adjustable vertical rod assembly 201 and a tripod base 30 which is coupled to the adjustable vertical rod assembly 201 and is configured to be collapsed and unfolded. An upper end of the adjustable vertical rod assembly 201 of each adjustable tripod stand 20 is detachably fixed to one end of one interlocking bar 10. When being installed and during usage, the interlocking bars 10 are used to support and transmit the force exerted on them by the backdrop 40, and the force is transmitted downward through the adjustable vertical bars 201 of the adjustable tripod stands 20, and finally reach the tripod bases 30 of the adjustable tripod stands 20, and finally the tripod bases 30 transmit all the forces to a supporting surface in a balanced manner, so that the adjustable backdrop support system kit can stably support itself and the backdrop on it.

In this preferred embodiment of the present invention, the assembling of two interlocking bars 10 is taken as an example for illustration, and the at least two interlocking bars 10 comprises a first interlocking bar 11 and a second interlocking bar 12. The first interlocking bar 11 and the second interlocking bar 12 are both embodied as hollow rigid tubes with the same diameter, and the first interlocking bar 11 and the second interlocking bar 12 can be interlocked to form an integral bar which is the supporting crossbar 101 that is extended along a longitudinal direction. In other words, in application, the first interlocking bar 11 and the second interlocking bar 12 are assembled in the longitudinal direction to form the supporting crossbar 101. Preferably, the diameter to of the supporting crossbar 101 is 1.3 ft.

The first interlocking bar 11 has a mounting hole 111 and a locking hole 112 disposed at a second end of the first interlocking bar 11, and at the same time, the first interlocking bar 11 has a first connecting hole 113 disposed at a first end of the first interlocking bar 11; the second interlocking bar 12 comprises a mounting head 121 and a locking member 122 located at a first end of the second interlocking bar 12, and at the same time, the locking head 122 is configured to have an elastic telescopic structure, when being pressed, the locking member 122 can be mostly retracted into the inside of the second interlocking bar 12.

The second interlocking bar 12 has a second connecting hole 123 disposed at a second end of the second interlocking bar 12. Moreover, after the locking member 122 of the second interlocking bar 12 is pressed and retracted, the mounting head 121 of the second interlocking bar 12 can be inserted into the mounting hole 111 of the first interlocking bar 11. When the locking member 122 reaches the position of the locking hole 112 of the first interlocking bar 11, the locking member 122 will automatically restore to its original position and snap into the locking hole 112 of the first interlocking bar 11, at the same time, the mounting head 121 of the second interlocking bar 12 is retained in the mounting hole 111 of the first interlocking bar 11, as shown in FIG. 3 of the drawings.

Figure 4:
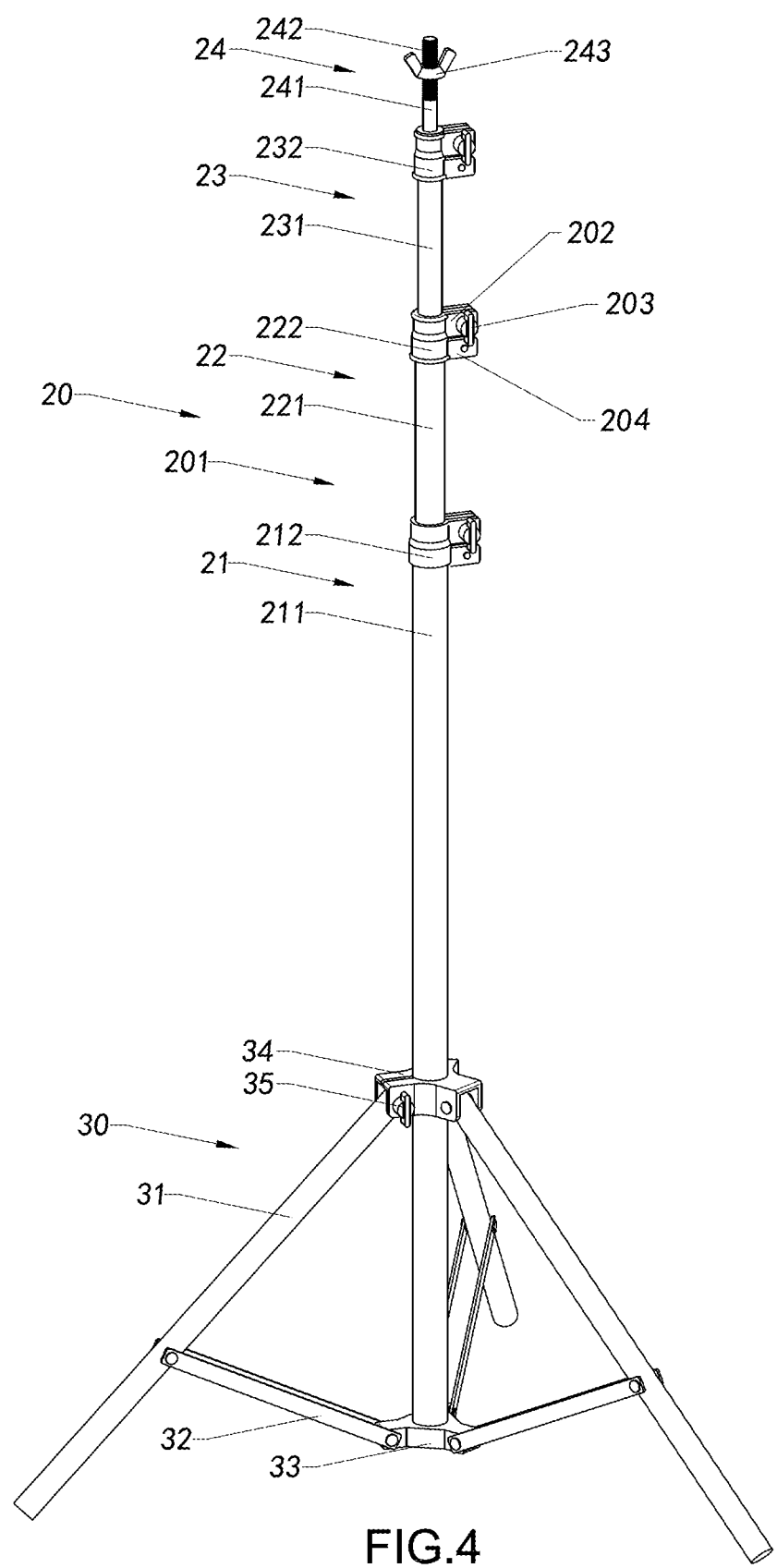
FIG. 4 is a perspective view of an adjustable tripod stand being in a deployment state according to the above preferred embodiment of the present invention.
Figure 5:
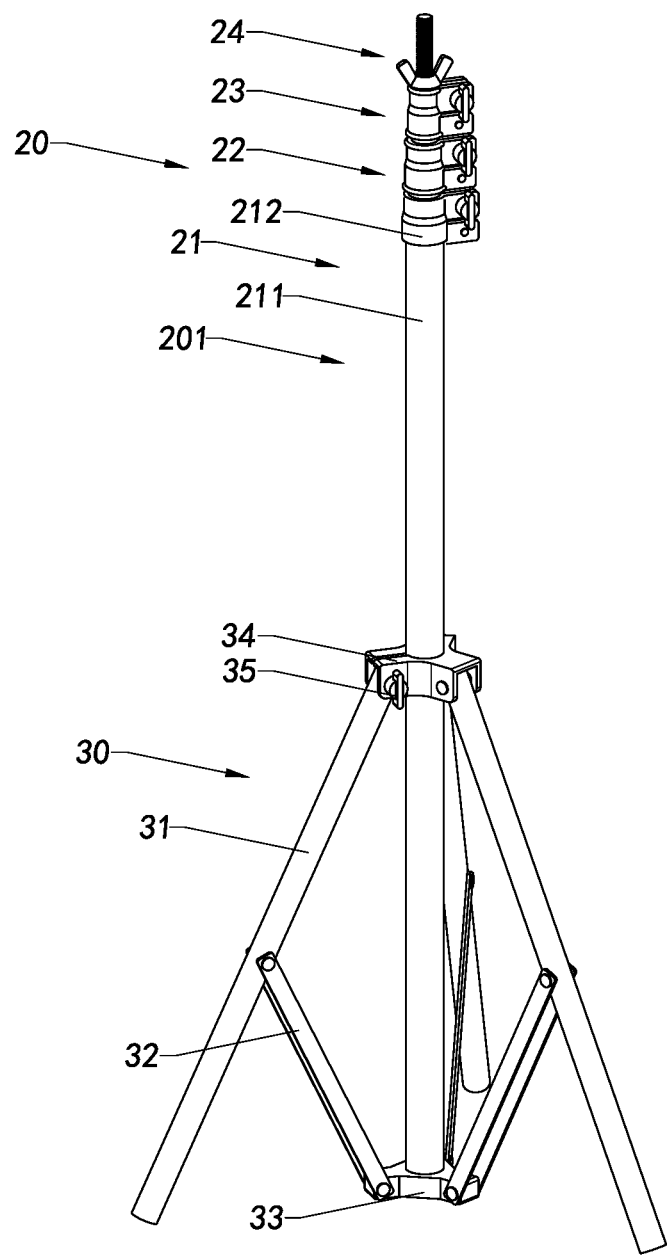
FIG. 5 is a perspective view of the adjustable tripod stand being in an collapsing process according to the above preferred embodiment of the present invention.
Figure 6:
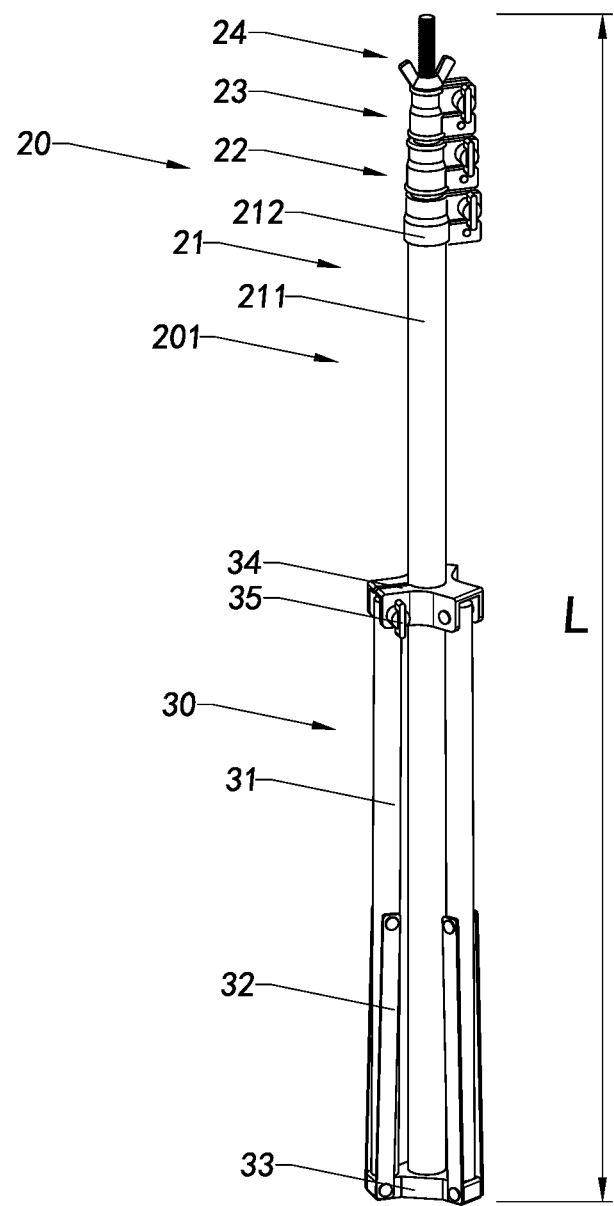
FIG. 6 is a perspective view of the adjustable tripod stand being in a fully collapsed and folded state according to the above preferred embodiment of the present invention.

As is shown in FIG. 4 to FIG. 6, the adjustable vertical rod assembly 201 of each adjustable tripod stand 20 comprises a first rod 21, a second rod 22, a third rod 23 and a fourth rod 24. The first rod 21, the second rod 22, the third rod 23 and the fourth rod 24 are sequentially and movably assembled in a manner that one rod is sleeved on other rod.

It is worth mentioning that, in this embodiment of the present invention, each adjustable tripod stand 20 is configured to be able to be raised and lowered in three stages that are taken as an example for description. In other words, each adjustable tripod 20 in this example comprises three stages of adjustable rods, and each adjustable tripod stand may also have other adjustment stages, such as two stages or four stages and above. More specifically, in this example, the adjustment of the second rod 22 by extending from and retracting into the first rod 21 is defined as a first stage of adjustment, and the adjustment of the third rod 23 by extending from and retracting into the second rod 22 is defined as a second state of adjustment, the adjustment of the fourth rod 24 by extending from and retracting into the third rod 23 is defined as a third stage of adjustment.

The first rod 21 comprise a first rod body 211 and a first quick fitting lock 212, the second rod 22 comprises a second rod body 221 and a second quick fitting lock 222, the third rod 23 comprises a third rod body 231 and a third quick fitting lock 232, the fourth rod 24 comprises a fourth rod body 241, a connector 242 and a fastener 243 Each of the rod bodies is telescopically movable and locked by the corresponding quick fitting locks. In other word, when one ore more of the rod body are moved to provide a required length, the position of the rod body is locked by the corresponding quick fitting lock, so that the rod body cannot move.

As is shown in FIGS. 1 and 2 of the drawings, connectors 242 of the fourth rods 24 of the two adjustable tripod stand 20 are respectively detachably engaged with the first connecting hole 113 of the first interlocking bar 11 and the second connecting hole 123 of the second interlocking bar 12. Each of the first connecting hole 113 of the first interlocking bar 11 and the second connecting hole 123 of the second interlocking bar 12 is embodied as a penetrating hole and is formed in an elongated slot shape, so as to provide an enough space for installation, so that the installation position can be better adjusted and corrected.

During installation and positioning, the connectors 242 of the fourth rods 24 are respectively penetrated through the first connecting hole 113 of the first interlocking bar 11 and the second connecting hole 123 of the second interlocking bar 12, and the connectors 242 are respectively fastened to the first interlocking bar 11 and the second interlocking bar 12 by the fasteners 243, so that the two adjustable tripod stands 20 are respectively fixed under the two ends of the supporting crossbar 101.

Each of the first quick fitting locks 212, the second quick fitting locks 222 and the third quick fitting locks 232 has an adjustable structure for adjusting the tightness of the locking performance, and the first quick fitting lock 212 is wound around an upper end of the first rod body 211, the second quick fitting lock 222 is wound around an upper end of the second rod body 221, the third quick fitting lock 232 is wound on an upper end of the third rod body 231, each connector 242 is connected to a top end of the fourth rod body 241 of the fourth rod.

Preferably, the first rod body 211, the second rod body 221, the third rod body 231 and the fourth rod body 241 are all hollow rigid pipes, and the inner diameter of the first rod body 211 is slightly larger than an outer diameter of the second rod body 221, the inner diameter of the second rod body 221 is slightly larger than an outer diameter of the third rod body 231, and an inner diameter of the third rod body 231 is slightly larger than an outer diameter of the fourth rod member 241, so that be means of this size configuration, the first rod body 211, the second rod body 221, the third rod body 231 and the fourth rod body 241 can be sleeved and assembled in sequence and also leaves a predetermined gap for allowing the telescoping movement of the rod bodies. In other words, the fourth rod body 241 is slidably sleeved in the third rod body 231, the third rod body 231 is slidably sleeved in the second rod body 221, and the second rod body 221 is slidably sleeved in the first rod body 211. And at the same time, the first quick fitting lock 212 can lock the second rod body 221 in position when the second rod body 221 slides to a desired position, the second quick fitting lock 222 can lock the third rod body 231 in position when the third rod body 231 slides to a desired position, and the third quick fitting lock 232 can lock the fourth rod body 241 in position when the fourth rod body 241 slides to a desired position, as is shown in FIG. 4. Each of the quick fitting locks 212, 222 and 232 comprises an upper part 202, a fastening member 203 for fastening the upper part 202 to an upper rod body, and a lower part 204 extended from the upper part 202 and is fixed and wound around a lower rod body. The upper part 202, which has a diameter that is smaller than a diameter of the lower part 204, is operatively coupled with the fastening member 203 to form the adjustable structure for adjusting the tightness of the locking performance.

Each tripod base 30 comprises three supporting legs 3, three connecting rods 32, a base support 33, a linkage ring 34 and a fastening member 35. The base support 33 of the tripod base 30 is installed on a bottom end of the first rod body 211 of the first rod 21 of each adjustable tripod stand 20, and the linkage ring 34 is slidably sleeved on the first rod body 211. The upper ends of the three supporting legs 31 are respectively movably installed on the linkage ring 34 at intervals of 120°.

Upper ends of the connecting rods 32 are respectively movably installed on the lower parts of the supporting legs 31, and at the same time, the lower ends of the connecting rods 32 are respectively movably installed on the outside of the base support 33 at intervals of 120°. The connecting rods 32 can share a part of the force when the tripod base 30 is unfolded to stabilize the entire arrangement. In addition, a length from the connection between each connecting rod 32 and the corresponding supporting leg 31 to a lower end of the support leg 31 is slightly smaller than a length of the connecting rod 32 itself, such configuration renders a relatively small volume when the tripod base 30 is collapsed because the connecting rods 32 are closely overlapped with the supporting legs 31 as much as possible, as shown in FIG. 6 of the drawings.

The fastening member 35 is adjustably installed at a connection position between one of the supporting legs 31 and the linkage ring 34, and is used to fix and retain the tripod base 30 in a predetermined state to prevent deformation when necessary, as is shown in FIG. 6B of the drawings. The supporting legs 31, the connecting rods 32, the linkage ring 34 and the base support 33 are connected to form a variable triangular structure which can have high stability during application. Moreover, the supporting legs 31, the connecting rods 32 and the linkage ring 34 form a structure of mutual force transmission and mutual influence.

The tripod base 30 comprises three supporting legs 31, three connecting rods 32, one base support 33, one linkage ring 34 and one fastening member 35, and the base support 33 is mounted at a bottom end of the adjustable vertical rod assembly 201, the linkage ring 34 is slidably sleeved on the adjustable vertical rod assembly 201, and each of the supporting legs 31 is pivotally mounted on the linkage ring 34, and one end of each connecting rod 32 is movably mounted on the lower part of the corresponding support leg 31, the other end of the connecting rod 32 is movably connected to the base support 33, and the fastening member 35 is movably connected at a connection position between one supporting leg 31 and the linkage ring 34 to fix the tripod base 30 to a predetermined to deployment and unfolding angle.

When the user needs to shift the tripod base 30 from the state of FIG. 6 to the state of FIG. 4, there are many ways to achieve the unfolding, a more convenient way is to apply an outward pulling force to one of the supporting legs 31 of the tripod base 30. At this time, the supporting leg 31 will pivotally move based on that its upper end is connected to the linkage ring 34. Meanwhile, the connecting rod 32 is also displaced due to the displacement of the supporting leg 31, but because one end of the connecting rod 32 is connected to the base support 33, a downward pulling force will be generated to pull down the supporting leg 31, and at the same time, the supporting leg 31 will drive the linkage ring 34 to slide downward, after that, the linkage ring 34 will drive the other supporting legs 31 and the connecting rods 32 to have the same displacement, so that all of the supporting legs 31 can maintain the same deployment degree, so as to ensure the stabiltiy of the tripod base 30 when unfolded.

To put it simply, all of the supporting legs 31 and the connecting rods 32 can be driven by the movement of the linkage ring 34, and the deployment angle of each supporting leg 31 with respect to the first rod body 211 should only depend on a distance between the base support 33 and the linkage ring 34, so that the height of the linkage ring 34 relative to the base support 33 can be changed to adjust the deployment angles of the supporting legs 31.

This configuration makes it very convenient when the arrangement of the present invention is unfolded. When the tripod base 30 in the state shown in FIG. 6 needs to be unfolded, it is only necessary to apply an appropriate downward pressure to the linkage ring 34 to make the linkage ring 34 move downward to drive each of the supporting legs 31 to unfold. As the linkage ring 34 continues to move downward, each of the supporting legs 31 will continue to deploy outward until the lower end of each of the supporting legs 31 abuts against a bearing supporting surface. At this time, the lower part of tripod base forms a more commonly used four-point support form of the preferred embodiment of the present invention, lower ends of the supporting legs 31 form an equilateral triangle supporting surface, and the base support 33 is located at the center of the triangular support surface to form a central supporting point. Finally, one of the supporting legs 31 is fastened to the linkage ring 34 by the fastening member 35 to make it unmovable, so that each of the supporting legs 31, each of the connecting rods 32 and the linkage ring 34 is fixed in the unfolded state. In other words, the tripod base 30 can be unfolded and fixed in position with a simple two-step operation.

Because the supporting legs 31, the connecting rods 32, the base support 33 and the linkage ring 34 form a linked movable structure, as long as any one of the components moves, it will drive all the other components to move. On the contrary, when one of the components is fixed, all the other components are fixed. Therefore, in this preferred embodiment of the present invention, the fastening member 35 is installed on the connecting position between one of the supporting legs 31 and the linkage ring 34 Similarly, the fastening member 35 can be installed at the connection of any two adjacent components in the structure, and the effect of fastening can also be achieved.

The adjustable backdrop support system kit of the preferred embodiment of the present invention comprising a plurality of detachable rigid components, and most of the components can be adjusted and moved. Therefore, during the installation and adjustment process, there may be a certain degree of asymmetry. If there is an tolerance in the height adjustment of each adjustable tripod stand 20, when the interlocking bars 10 are installed on the connectors 242 of the fourth rods 24 of the two adjustable tripod stands 20, an unbalanced stress will be generated inside the overall structure of the present invention due to the unbalanced height and the gravity of each component, resulting in uneven stress and poor stability. Therefore, the first connecting hole 113 of the first interlocking bar 11 and the second connecting hole 123 of the second interlocking bar 12 are designed as arc-shaped elongated holes, so that the connectors 242 can have a predetermined movement space, so that when the connectors 242 are installed and fastened, the connectors 242 can be coupled to the first connecting hole 113 of the first interlocking bar 11 or the second connecting hole 123 of the second interlocking 12 and have a certain mobility and flexibility, so that during installation, the first connecting hole 113 of the first interlocking bar 11 or the second connecting hole 123 of the second interlocking bar 12 can be automatically displaced because a appropriate force from each connector 242, so as to eliminate a part of stress on the structure, so as to increase the stability of the each entire tripod base stand 20, so as to provide a stable support performance.

Figure 7:
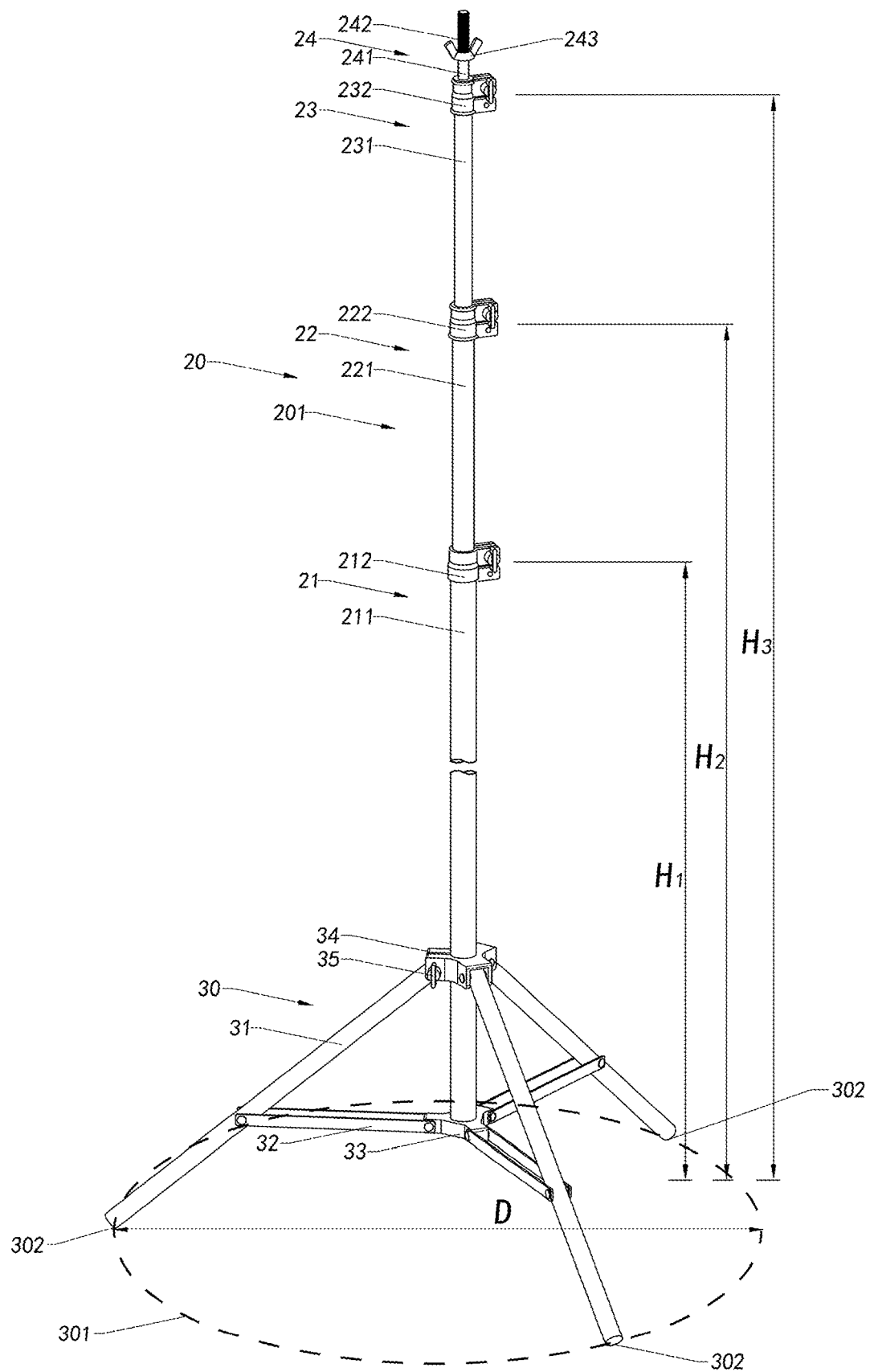
FIG. 7 is a perspective view of the adjustable tripod stand being in a fully unfolded state according to the above preferred embodiment of the present invention.

Referring to FIG. 7 of the drawings, each adjustable tripod stand 20 is shown to have a first support height H1, a second support height H2 and a third support height H3, the first support height H1 corresponds to a support state in which the second rod 22, the third rod 23 and the fourth rod 24 are received in the first rod 21. In other words, the first support height H1 corresponds to the supporting height of the first rod body 21. The second support height H2 corresponds to a support state in which the second rod 22 is drawn out and the third rod 23 and the fourth rod 24 are received in the second rod 22. The third support height H3 corresponds to a support state in which the second rod 22, the third rod 23 and the fourth rod 24 are all drawn out, so that the adjustable tripod 20 is fully opened and supported. When the tripod base 30 of each adjustable tripod 20 is fully opened, lower ends of the components of the tripod base 30 form a stable support surface 302 which is shown in FIG. 7 to be along a circle 301.

It is worth mentioning that the support stability of each adjustable tripod stand 20 is related to a deployment area of the tripod base 30 and the support height of the adjustable vertical rod assembly 201. The lower the center of gravity of each adjustable tripod 20 is, the more stable each adjustable tripod stand 20 is. In the case of the supporting surface of the tripod base 30 having a same area, when the height of the adjustable vertical rod assembly 201 is lower, the corresponding adjustable tripod stand is more stable. Considering the requirement of support height, support stability and the area occupied by balance, it is found that, preferably, when the first support height H1 of each adjustable tripod stand 20 of the adjustable backdrop support system kit 1 is 3.12 ft, the second support height H2 is 4.8 ft, the third support height H3 is 6.5 ft or 8.5 ft, the diameter D of the circle 301 of the support surface 302 is 2.1 ft, and the support width by the at least two interlocking bars 10 is 10 ft, and when the weight of the backdrop 40 is less than 11 pounds, the support stability of the support system 100 is better.

It is also worth mentioning that when both the tripod base 30 and the adjustable vertical rod assembly 201 of each adjustable tripod stand 20 are in the collapsed state, the length of the adjustable tripod stand 20 is the shortest, so that the storage length of the adjustable tripod stand 20 in decreased to 2.26 ft. In the case of this preferred parameter, when the adjustable tripod stand 20 is fully opened, the support system 100 assembled by the adjustable tripod stands 20 and the at least two interlocking bars 10 satisfies various requirements of the adjustable backdrop support system kit, and has good stability. In other words, falling over of the arrangement is less likely to occur, and it has better safety.

The adjustable width of the support system 100 is 5-10 ft, and the adjustable height is 2.5-9 ft. The maximum load weight of the supporting crossbar 101 is 5 kg, and within the load weight range, the supporting crossbar 101 will not be deformed.

Figure 8:
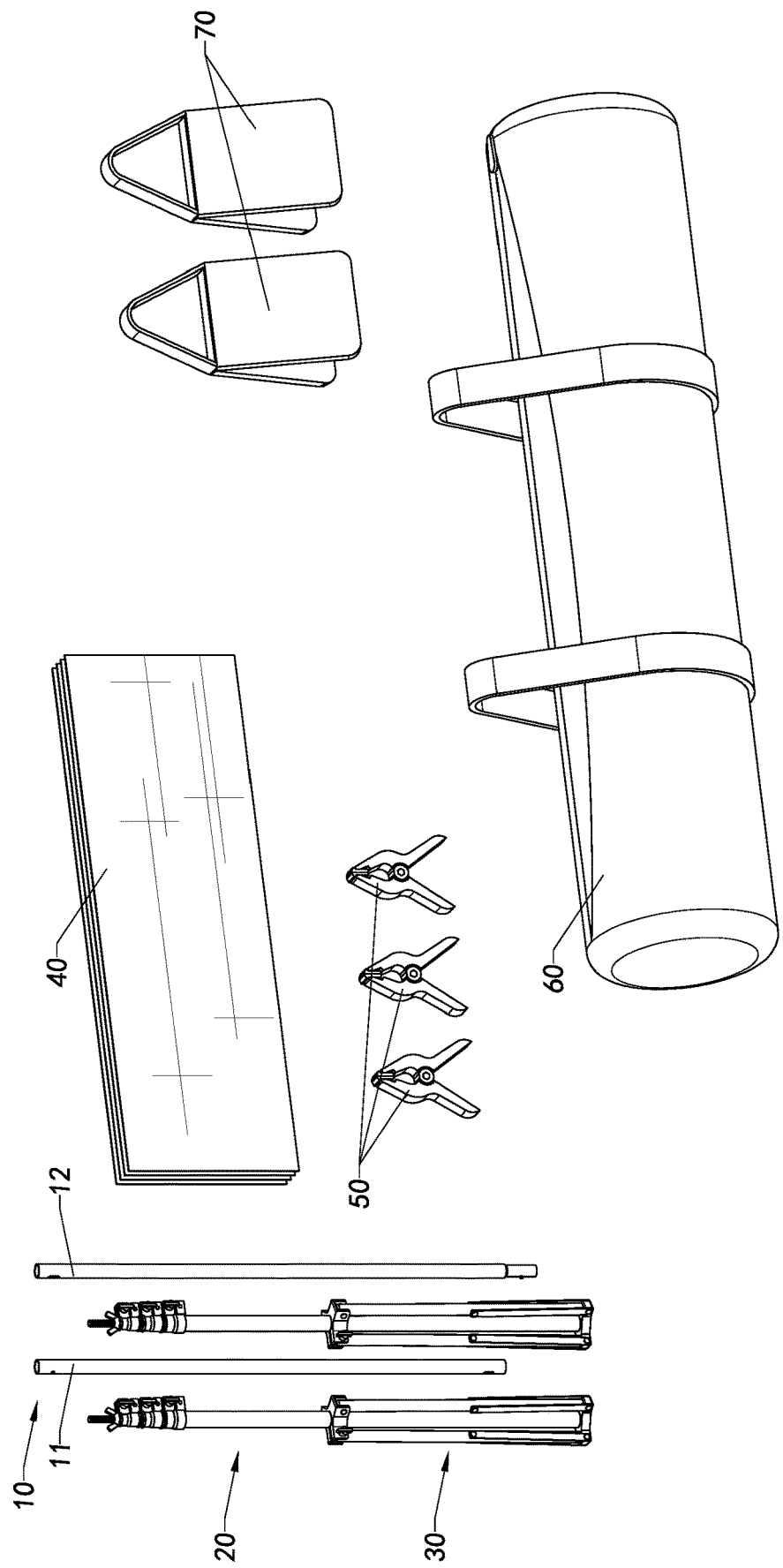
FIG. 8 is a perspective view of the adjustable backdrop support system kit being in a state ready for storing according to the above preferred embodiment of the present invention.

Referring to FIG. 8 of the drawings, after the adjustable backdrop support system kit 1 finishes the usage, the at least two interlocking bars 10 can be unlocked from each other. Each adjustable tripod stand 20 can be collapsed to form a generally elongated structure, and the backdrop 40 can be folded. In other words, the at least two interlocking bars 10, the adjustable tripod stands 20 and the backdrop 40 can be collapsed to form a smaller storage state. In the storage state, the adjustable backdrop support system kit 1 is suitable for being accommodated in a carrying case 60. In other words, the at least two interlocking bars 10, the two adjustable tripod stands 20, the backdrop 40, and the plurality of the spring clamps 50 of the adjustable backdrop support system kit 1 are suitable for being stored in the carrying case 60.

Figure 9:
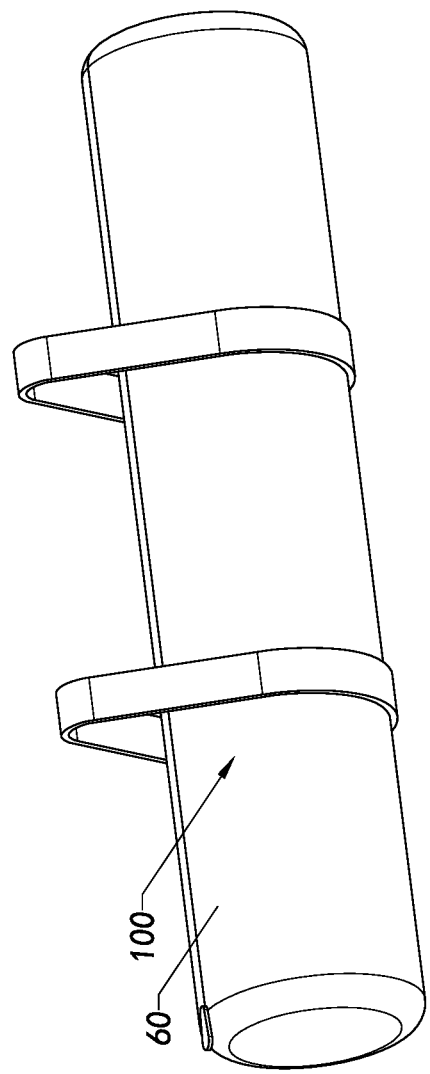
FIG. 9 is a perspective view of the adjustable backdrop support system kit being in a storing state according to the above preferred embodiment of the present invention.

Referring to FIG. 9 of the drawings, after the adjustable backdrop support system kit 1 is stored in the carrying case 60, the adjustable backdrop support system kit 1 forms an integral columnar or elongated structure which is convenient to carry and transport. In other words, the at least two interlocking bars 10, the two adjustable tripod stands 20, the backdrop 40, and the plurality of the spring clams 50 are all reasonably accommodated inside the carrying case 60.

It is worth mentioning that when each adjustable tripod stand 20 is collapsed and folded, the volume of the adjustable tripod stand 20 is obviously reduced, and the length of the adjustable tripod stand 20 is approximately the same as the length of the interlocking bars 10, so that the multiple interlocking bars 10, the two adjustable tripod stands 20, the backdrop 40 and the spring clamps 50 can be reasonably accommodated inside the carrying case 60 to form a substantially elongated state without occupying too much space.

When the adjustable backdrop support system kit 1 is in use, the backdrop 40 is supported on the support system 100 assembled by the at least two interlocking bars 10 and the adjustable tripod stands 20. Under action of gravity, a front backdrop segment 41 and a rear backdrop segment 42 are formed, through the adjustment of the lengths of the front backdrop segment 41 and the rear backdrop segment 42, it is able to form backgrounds covering different spatial areas, so as to provide different background screen states.

Figure 10:
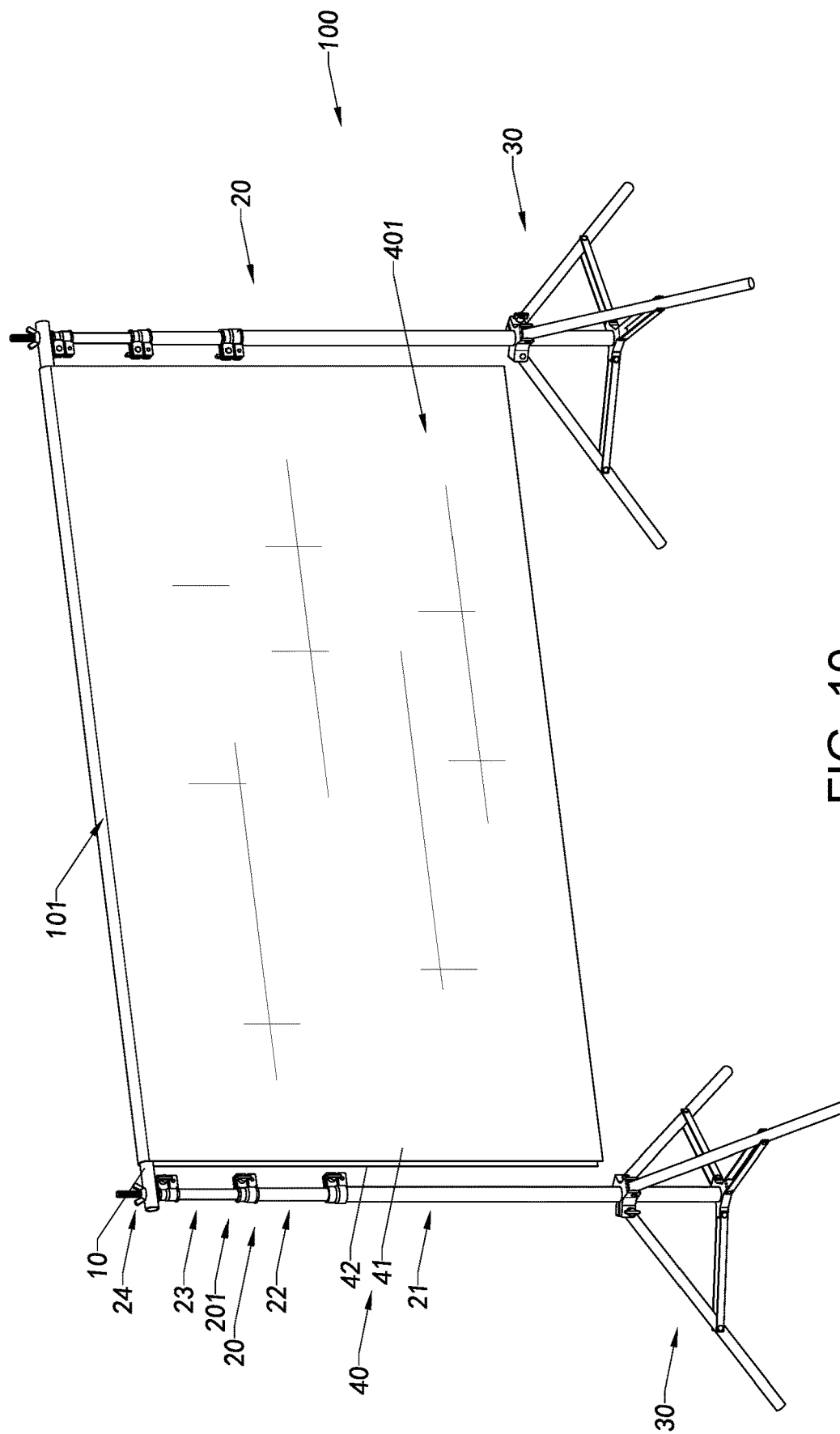
FIG. 10 is a perspective view of the adjustable backdrop support system kit being in a first background state according to the above preferred embodiment of the present invention.

Referring to FIG. 10 of the drawings, the adjustable backdrop support system kit 1 has a first background state 401 in which the two adjustable tripod stands 20 and the interlocking bars 10 constitute the support system 100 and the backdrop 40 is symmetrically supported on both sides of the interlocking bars 10, and the lengths of the front backdrop segment 41 and the rear backdrop segment 42 are approximately the same. In other words, in the first background state 401, the spring clamps 50 are not needed to be used to fix the backdrop 40, and the front backdrop segment 41 and the rear backdrop segment located on both sides of the interlocking bars 10 are balanced by their own gravity.

Figure 11:
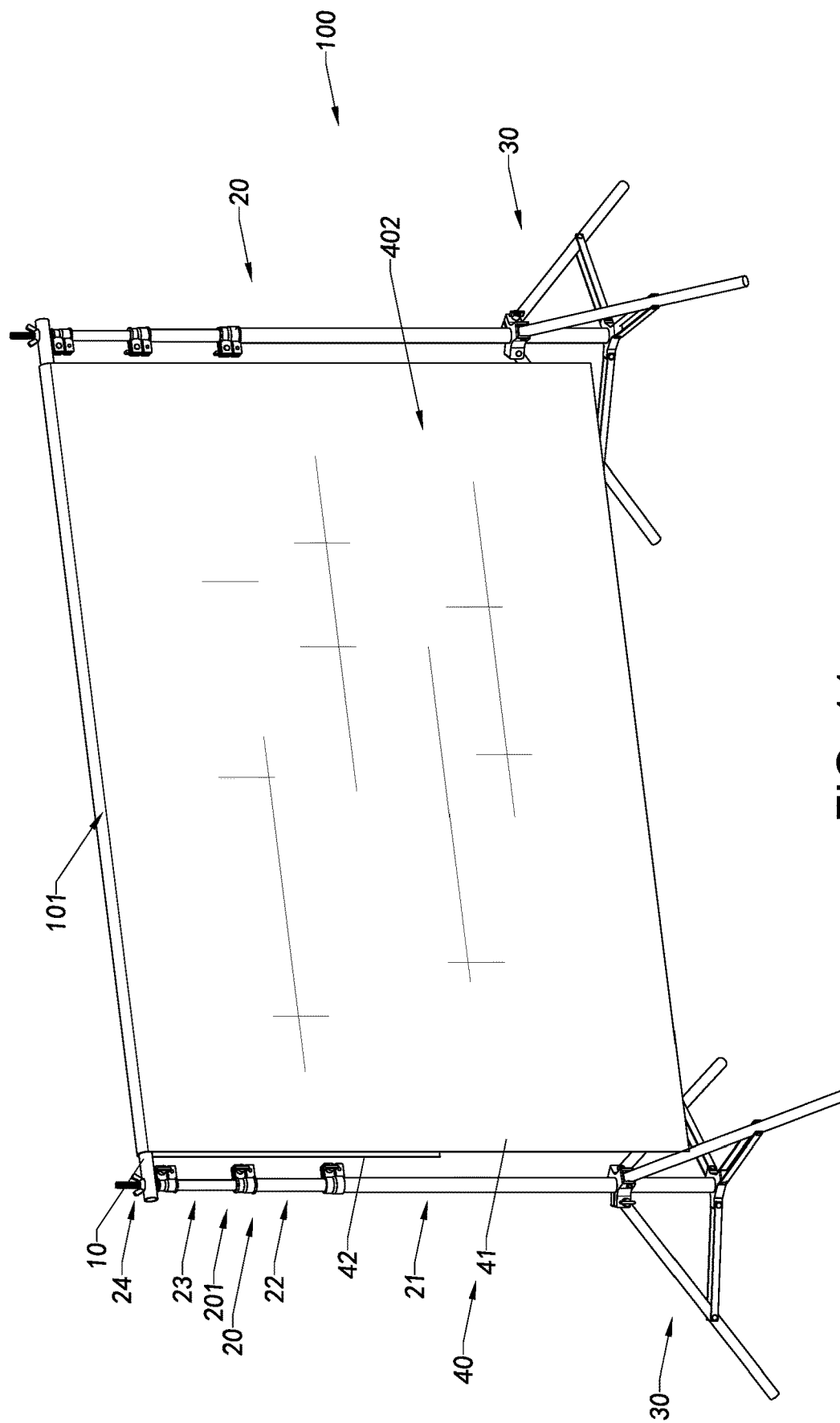
FIG. 11 is a perspective view of the adjustable backdrop support system kit being in a second background state according to the above preferred embodiment of the present invention.

Referring to FIG. 11 of the drawings, the curtain has a second background state 402. In the second background state 402 in which the two adjustable tripod stands 20 and the at least two interlocking bars 10 constitute the support system 100, and the backdrop is supported on both sides of the at least two interlocking bars 10, and the length of the front backdrop segment 41 is greater than the length of the rear backdrop segment 42. And in the second background state 402, by the gravity distribution of the backdrop 40 and the friction between the backdrop 40 and the at least two interlocking bars 10, the background drop 40 does not slip off the at least two interlocking bars 10. In other words, without the clamping and fixing action of the spring clamps 50, the backdrop 40 can adjust the size of the covered background space between the first background state 401 and the second background state 402.

Figure 12:
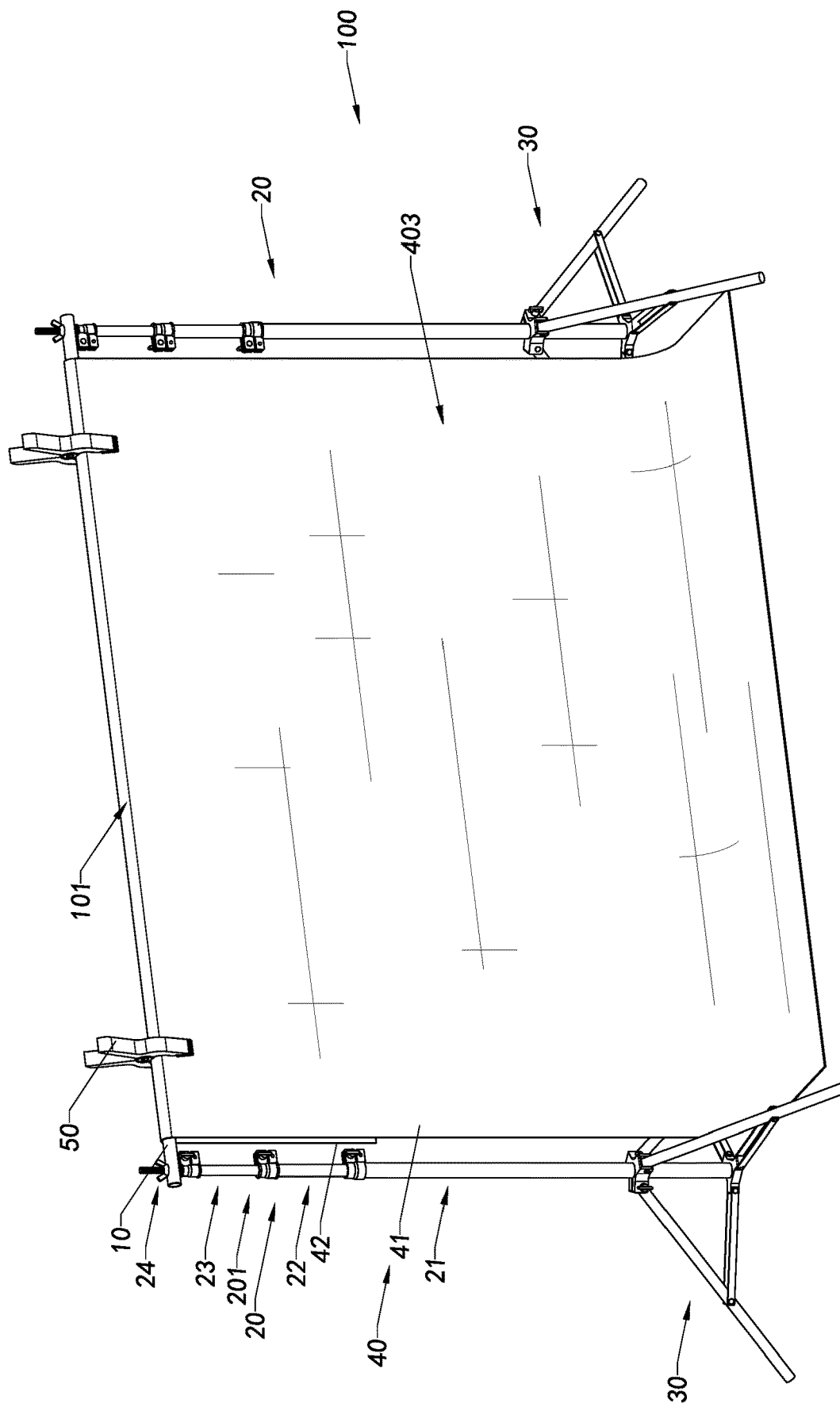
FIG. 12 is a perspective view of the adjustable backdrop support system kit being in a third background state according to the above preferred embodiment of the present invention.

Referring to FIG. 12 of the drawings, the adjustable backdrop support system kit 1 has a third background state 403 in which the two adjustable tripod stands 20 and the interlocking bars 10 constitute the support system 100 and the backdrop 40 is supported on both sides of the supporting crossbar 101, the length of the front backdrop segment 41 is greater than the length of the rear backdrop segment 42, and the plurality of spring clamps 50 clamp and fix the backdrop 40 to the at least two interlocking bars 10. In other words, in this state, if the spring clamps 50 are removed, the backdrop 40 is easily slipped off from the at least two interlocking bars 10.

In the third background state 403, the front backdrop segment 41 of the backdrop can extend forward, that is, the backdrop 40 can cover the ground in front of the backdrop 40, thereby forming a top-down and forward extending background environment.

Figure 13:
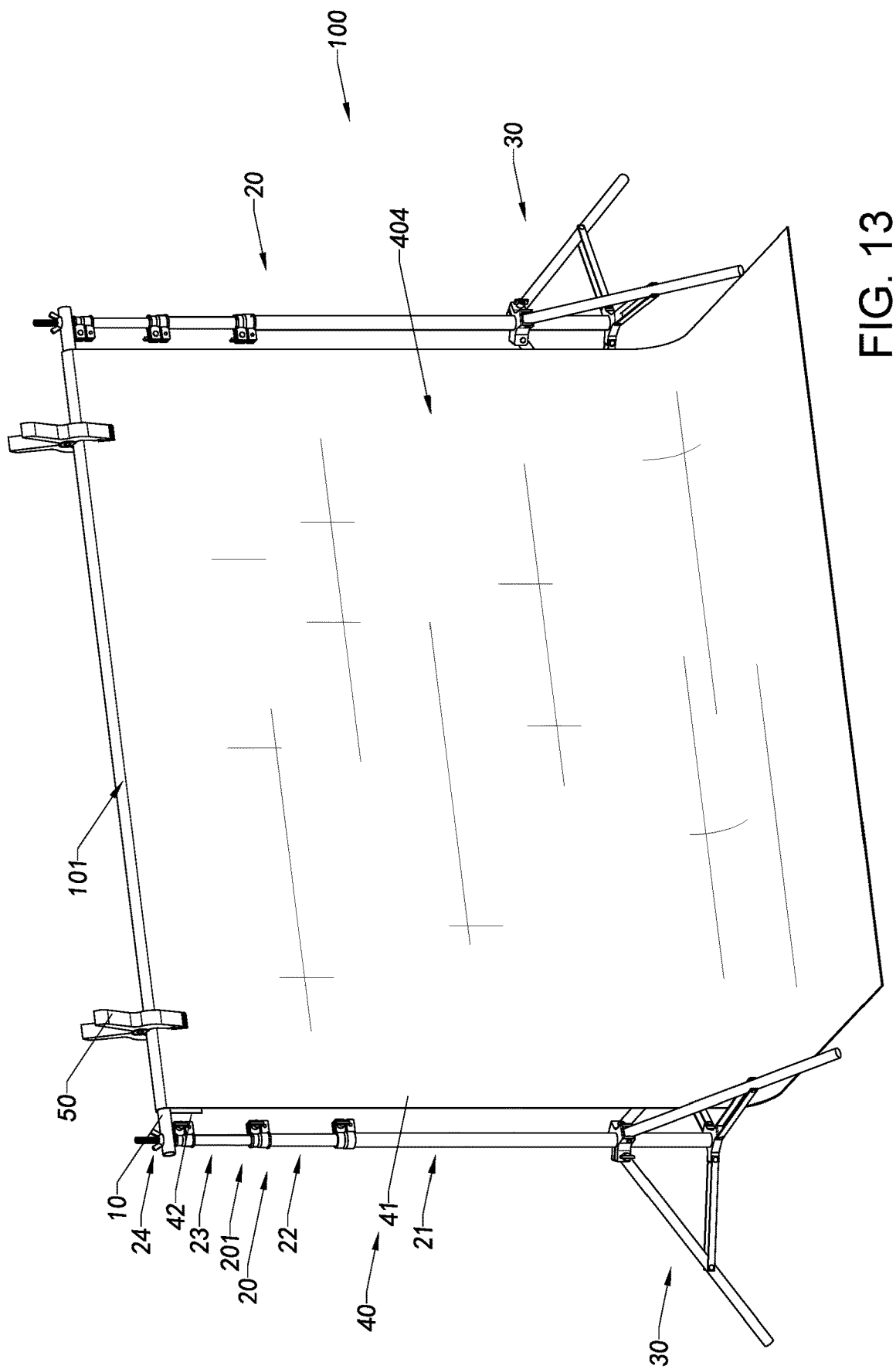
FIG. 13 is a perspective view of the adjustable backdrop support system kit being in a fourth background state according to the above preferred embodiment of the present invention.

Referring to FIG. 13 of the drawings, the adjustable backdrop support system kit 1 has a fourth background state 404 in which the two adjustable tripod stands 20 and the interlocking bars 10 constitute the support system 100 and the backdrop 40 is supported on both sides of the supporting crossbar 101 with the length of the front backdrop segment 41 much greater than the length of the rear backdrop segment 42, the rear backdrop segment 40 is only used for clamping the backdrop 40 on the supporting crossbar 101. And the plurality of spring clamps 50 clamp and fix the backdrop 40 to the at least two interlocking bars 10. In other words, in this state, if the spring clamps 50 are removed, the backdrop 40 is easily slipped off from the at least two interlocking bars 10, and the length of the front backdrop segment 41 reaches the maximum value.

Similarly, in the fourth background state 404, the front backdrop segment 41 of the backdrop 40 can extend forward, that is, the backdrop 40 can cover the ground in front of the backdrop 40, thereby forming a top-down and forward extending background environment.

Figure 14:
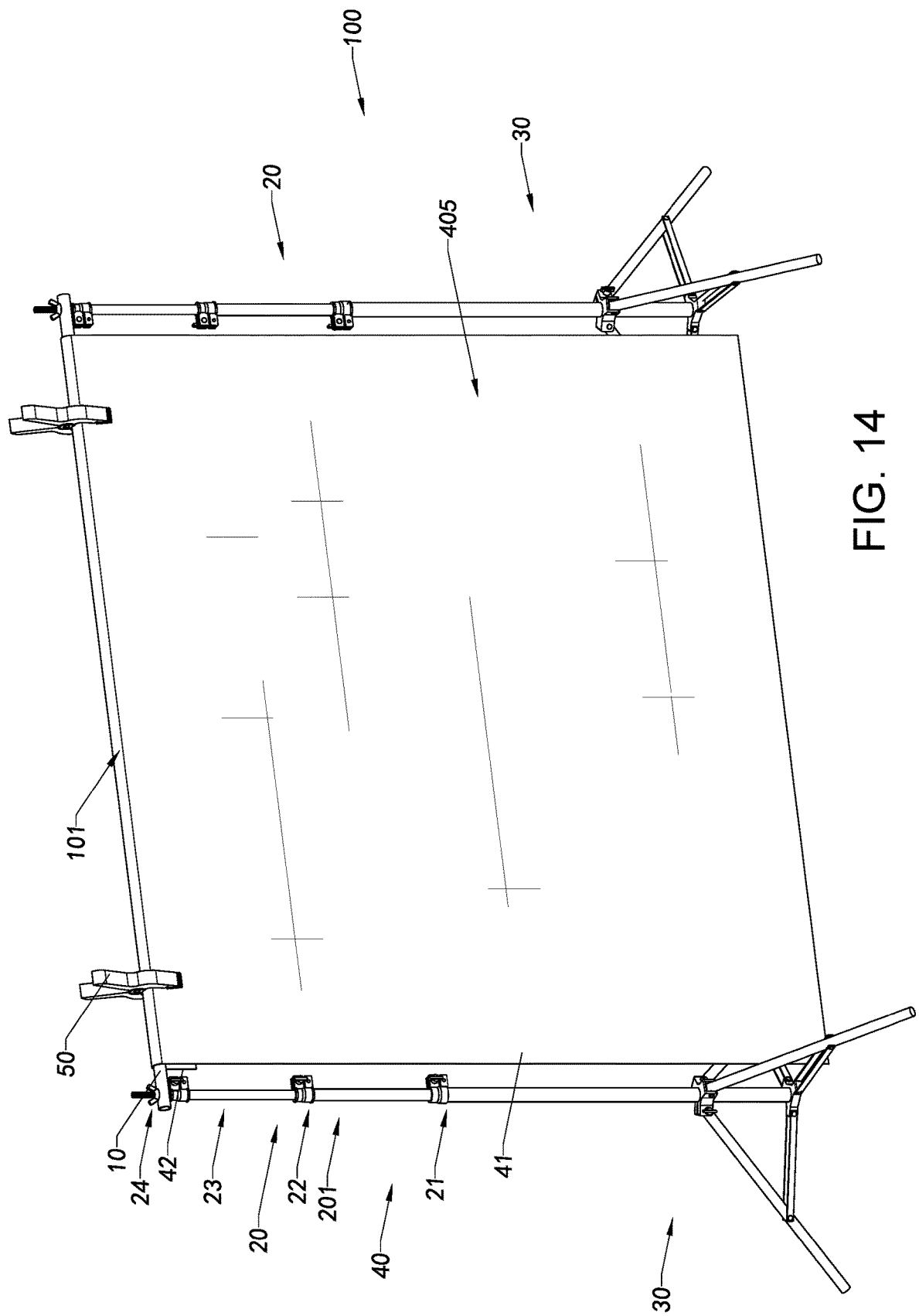
FIG. 14 is a perspective view of the adjustable backdrop support system kit being in a fifth background state according to the above preferred embodiment of the present invention.

Referring to FIG. 14 of the drawings, in this embodiment of the present invention, when the adjustable backdrop support system kit 1 is at the third support height H3, a smaller-sized backdrop 40 is clamped and fixed on the supporting crossbar 101 of the adjustable backdrop support system kit 1 to form a fifth background state 405. In the fifth background state 405, one end of the backdrop 40 is clamped and fixed to the at least two interlocking bars 10, and the other end extends to the ground, that is, the other end of the backdrop 40 extends vertically to the support surface of the support system 100 under the action of gravity, thereby forming a substantially vertical background surface.

It is worth mentioning that, based on the aforementioned parameters selection, the adjustable backdrop support system kit 1 of the present invention in the first background state 401, the second background state 402, the third background state 403, the fourth background state 404 and the fifth background state 405 can maintain good stability and is not easy to fall.

Although several preferred embodiments of the present invention have been described above in details, it does not mean that the scope of the present invention is limited to the above-mentioned preferred embodiments, and the embodiments of the present invention can be modified in any way without departing from the principles described above. the modifications include but not limited to replacing materials, modifying structure, changing appearance, adjusting size, etc., and these modifications should be included in the spirit of the present invention.

What is claimed is:

1. An adjustable backdrop support system for supporting a backdrop, comprising:
   at least two interlocking bars; and
   two adjustable tripod stands, during usage, said at least two interlocking bars are interlocked with each other to form a supporting crossbar comprising two ends which are respectively on tops of said two adjustable tripod stands to configure a support system for supporting the backdrop at a predetermined height, wherein the backdrop is adapted for being supported by said supporting crossbar and being extending downward to provide a photographing background environment;

wherein each of said two adjustable tripod stands comprises an adjustable vertical rod assembly and a tripod base which is mounted to said adjustable vertical rod assembly and is able to be collapsed and unfolded;

wherein said adjustable vertical rod assembly comprises a first rod, a second rod, a third rod and a fourth rod, wherein said first rod, said second rod, said third rod and said fourth rod are telescoping rods that are sequentially sleeved with each other;

wherein said first rod comprises a first rod body and a first quick fitting lock, wherein said second rod comprises a second rod body and a second quick fitting lock, wherein said third rod comprises a third rod body and a third quick fitting lock, wherein each of said first rod body, said second rod body and said third rod body are telescoping rod bodies and are locked at predetermined height by said first quick fitting lock, said second quick fitting lock and sad third quick fitting lock;

wherein each of said first quick fitting lock, said second quick fitting lock and said third quick fitting lock comprises an upper part, a fastening member for fastening said upper part to an upper rod body, and a lower part extended from said upper part and is fixed and wound around a lower rod body, wherein said upper part, which has a diameter that is smaller than a diameter of said lower part, is operatively coupled with said fastening member to form an adjustable structure for adjusting the tightness of the locking performance of each of said first quick fitting lock, said second quick fitting lock and said third quick fitting lock;

wherein each of said two adjustable tripod stands has a first support height in a state in which said tripod base is fully unfolded and said second rod body, said third rod body and said fourth rod body are retracted in said first rod body, wherein said first support height is 3.12 ft;

wherein each of said two adjustable tripod stands has a second support height in a state in which said tripod base is fully unfolded and said second rod body is drawn out from said first rod body while said third rod body and said fourth rod body are retracted in said second rod body, wherein said second support height is 4.8 ft;

wherein each of said two adjustable tripod stands has a third support height in a state in which said tripod base is fully unfolded and said second rod body, said third rod body and said fourth rod body are drawn out, wherein said third support height is 6.5 ft or 8.5 ft, wherein said tripod base which is fulled unfolded defines a support surface along a circle at a bottom side thereof, wherein a diameter of the circle is 2.1 ft.

2. The adjustable backdrop support system according to claim 1, wherein a weight of the backdrop is less than 11 ponds.

3. The adjustable backdrop support system according to claim 1, wherein when each of said two adjustable tripod stands is in a collapsed state, a length thereof is reduced to 2.26 ft.

* * * * *